(12) United States Patent
Jardine et al.

(10) Patent No.: US 6,641,661 B1
(45) Date of Patent: Nov. 4, 2003

(54) HIGH EARLY STRENGTH CEMENT AND ADDITIVES AND METHODS FOR MAKING THE SAME

(75) Inventors: Leslie A. Jardine, Salem, MA (US); Josephine H. Cheung, Waltham, MA (US); Walter M. Freitas, Sao Paulo (BR)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/979,773

(22) PCT Filed: May 26, 2000

(86) PCT No.: PCT/US00/14794

§ 371 (c)(1),
(2), (4) Date: Jan. 30, 2002

(87) PCT Pub. No.: WO00/76936

PCT Pub. Date: Dec. 21, 2000

(51) Int. Cl.⁷ ................................................ C04B 24/02
(52) U.S. Cl. ...................... 106/802; 106/724; 106/727; 106/729; 106/823; 524/5
(58) Field of Search ................................ 106/802, 724, 106/727, 729, 823; 524/5

(56) References Cited

U.S. PATENT DOCUMENTS

| | | | |
|---|---|---|---|
| 4,547,223 A | 10/1985 | Goto et al. | 106/90 |
| 5,393,343 A | 2/1995 | Darwin et al. | 106/808 |
| 5,556,460 A | 9/1996 | Berke et al. | 106/823 |
| 5,618,344 A | 4/1997 | Kerkar et al. | 106/823 |
| 5,622,558 A | 4/1997 | Berke et al. | 106/802 |
| 5,779,788 A | 7/1998 | Berke et al. | 106/802 |
| 5,840,114 A * | 11/1998 | Jeknavorian et al. | 106/802 |
| 6,139,623 A * | 10/2000 | Darwin et al. | 106/823 |
| 6,352,952 B1 * | 3/2002 | Jardine et al. | 501/141 |
| 6,358,310 B1 * | 3/2002 | Berke et al. | 106/802 |
| 6,441,054 B1 * | 8/2002 | Ou et al. | 516/11 |

* cited by examiner

*Primary Examiner*—Paul Marcantoni
(74) *Attorney, Agent, or Firm*—Craig K. Leon; William L. Baker

(57) ABSTRACT

A method for improving early strength of cements, comprising introducing into a cement during the grinding thereof (a) at least one water reducer comprising a polyoxyalkylene polymer; (b) a sugar; (c) an alkali or alkaline earth metal chloride; and (d) an amine. Additives and cement compositions are also disclosed.

21 Claims, No Drawings

HIGH EARLY STRENGTH CEMENT AND ADDITIVES AND METHODS FOR MAKING THE SAME

FIELD OF THE INVENTION

The present invention relates to additives for cements, and more particularly to additives for increasing early strength of cements, methods for improving the early strength of cements, and high early strength cements.

BACKGROUND OF THE INVENTION

The term "cement" has used herein means and refers to hydratable cementitious binder that is used for making materials such as mortar and concrete. Cements may comprise, for example, Ordinary Portland Cement (OPC), or "blended cements," the latter of which can refer to OPC blended with ground limestone or OPC blended with pozzolanic materials to form "pozzolanic" cements. Pozzolanic cements therefore typically incorporate one or more of the following pozzolanic materials—such as slag, metakaolin, fly ash, natural pozzolans—to allow manufacturers to substitute for portions of Portland cement clinker, thereby providing an economic benefit.

There is economic competition between manufacturers of pozzolanic cements and manufacturers of the more expensive ordinary Portland cements (OPC). Customers thus frequently need to choose between OPC and the less expensive pozzolanic cements, which can have comparatively less early strength and a higher water demand. Accordingly, the present inventors believe that novel additives for improving early strength in cements, and in particular pozzolanic cements, while decreasing water demand, are needed.

SUMMARY OF THE INVENTION

The present invention provides high early strength cement additives, cement compositions, and methods for increasing early strength in cements and cementitious compositions. The additives of the invention are believed to be useful for pozzolanic cements, blended cements, e.g., Ordinary Portland Cement and ground limestone, as well as OPC by itself, although it is believed that the benefits with pozzolanic cements would be most valued by customers due to reduction of costs.

An exemplary method of the present invention for increasing early strength in cement (e.g., preferably blended cement, and most preferably pozzolanic cement), comprises introducing into the cement, preferably during the grinding thereof, (a) at least one water reducer comprising polyoxyalkylene groups; (b) a sugar; and (c) an alkali or alkaline earth metal chloride. An amine is optionally added into the grinding process in further exemplary methods.

Exemplary additives of the present invention for improving early strength of cement (preferably blended cement, and most preferably pozzolanic cement), comprises (a) at least one water reducer comprising polyoxyalkylene groups; (b) a sugar; (c) an alkali or alkaline earth metal chloride; and (d) optionally an amine. Preferably, the additives are introduced as an aqueous solution during the grinding of the cement. Exemplary cement compositions of the invention comprise a mixture of cement (preferably blended cement, and most preferably pozzolanic cement), in combination with the above-described polyoxyalkylene water reducer, sugar, and alkali or alkaline earth metal chloride.

Further features and advantages of the invention may be described in detail hereinafter.

DETAILED DESCRIPTION OF EXEMPLARY EMBODIMENTS

The present invention can be achieved in the form of an additive (comprising a polyoxyalkylene water reducer, a sugar, and an alkali or alkaline earth metal chloride) which can be added into a cement (preferably blended cement, and most preferably pozzolanic cement) during the grinding stage, or into a cementitious composition (including one that contains blended or pozzolanic cement with fine aggregate (sand) and/or course aggregate (gravel, stones); a cement (or cementitious composition such as masonry cement, mortar, or concrete) containing the aforementioned components (either as an admixture or, more preferably, incorporated during the manufacture of cement as interground additives); and also as a method for improving the early strength of cement by incorporating the additive components during grinding of cement.

Polyoxyalkylene polymers have been used as water reducers for Portland cement. Preferably, the polymers are comb polymers having a backbone and pendant groups, with the polyoxyalkylene groups contained in the backbone, in the pendant groups, or in both. Comb polymer-type water reducers are known and believed to be suitable for use in the present invention. For example, U.S. Pat. 5,393,343 of Darwin et al., which is incorporated fully herein by reference, taught an EO/PO type comb polymer useful as a superplasticizer or water-reducer for retaining in concrete a high degree of slump (e.g., high flowability) over a sustained period of time. The term "EO/PO" is sometimes synonymous with the term "oxyalkylene group" and serves as a convenient short-hand to designate polyoxyalkylene groups which are combinations of ethylene oxide (EO)/propylene oxide (PO) repeating units.

Preferably, an EO/PO type comb polymer is employed having a polymer backbone, e.g., carbon backbone, to which are attached both carboxylate groups (which function as cement anchoring groups in the cementitious mixture) and pendant groups such as ethylene oxide (EO) groups, propylene oxide (PO) groups, and/or a combination of EO/PO groups. The pendant groups may be ionic or non-ionic. Further examples of EO/PO type comb polymer water-reducers are shown in U.S. Pat. Nos. 4,946,904, 4,471,100, 5,100,984 and 5,369,198. These patents describe comb polymers which are, for example, copolymers of, polycarboxylic monomers such as maleic acid or anhydride and polymerizable EO/PO—containing monomers such as polyalkylene glycol monoallyl ethers, etc.

In U.S. Pat. No. 5,840,114, there is disclosed an exemplary polyoxyalkylene polymer which may be suitable for the invention. The polymer comprises a carbon containing backbone to which is attached to groups shown by the structures (I) and (II), and optionally groups shown by structures (II) and (IV) as shown below:

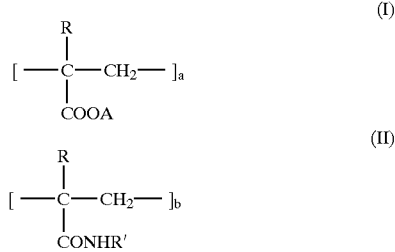

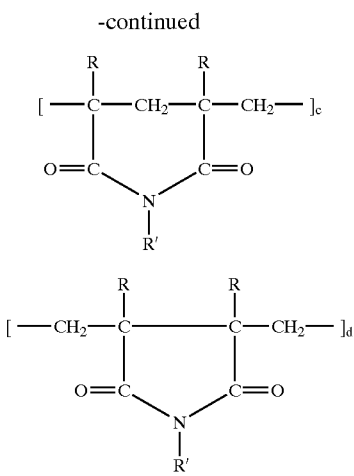

wherein each R independently represents a hydrogen atom or a methyl group (—CH$_3$) group; A represents hydrogen atom, a C$_1$–C$_{10}$ alkyl group, R' or an alkali metal cation or a mixture thereof; R' represents a hydrogen atom or a C$_2$–C$_{10}$ oxyalkylene group represented by (BO)$_n$R" in which O represents an oxygen atom, B represents a C$_2$–C$_{10}$ alkylene group, R" represents a C$_1$–C$_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100–a) and is preferably from 3 to 10; and b is not more than [100–(a+c+d)].

(The letter "B" is being used for lexographical convenience herein to denote an alkylene group. Those of ordinary skill in the art will realise that "B" herein does not represent boron).

A commercially available polyoxyalkylene polymer which is suitable for the purposes of the present invention is available from Grace Construciton Products under the brandname ADVA®. This product is specifically a polyacrylic acid comb polymer made by grafting a polyoxyalkylene amine onto a polycarboxylic acid backbone (amidization/imidization reaction).

Another polyoxyalkylene polymer which is believed to be suitable can be obtained by polymerization of maleic anhydride and an ethylenically-polymerizable polyalkylene, as prepared in U.S. Pat. No. 4,471,100, the entire disclosure of which is incorporated herein by reference. This is believed to be sold in the form of metallic salts formed by final reaction of the polymers with a base such sodium or calcium hydroxide.

It is also contemplated that polyoxyalkylene polymers may not necessarily require comb structures (i.e., backbone with pendant groups), but may have a linear or branched structure, or other structures.

Exemplary polyoxyalkylene polymers will preferably have a molecular weight of between 3,000–100,000 and more preferably 15,000–50,000.

The preferred amount of polyoxyalkylene water reducer used in the invention should be in the range of 0.0002–0.4 percent, and more preferably 0.0025–0.075 percent, based on the dry weight of cement (e.g., Portland cement plus pozzolans).

Exemplary sugars useful in the present invention may be used in dry powder form, but are preferably incorporated in an aqueous solution. Sugars which are conventionally used in the cement and concrete industry may be used in the present invention, and these include glucose, sucrose, fructose, tetrose, pentose, hexose, etc., including corn syrup and molasses. Also useful in the present invention are gluconic acid, heptogluconic acid, and their salts (e.g., gluconate, heptogluconate). A mixture of sodium gluconate and corn syrup, optionally with molasses, is especially preferred. It is believed that other sugars may be used in the invention, such as those derived from or based upon aldonic acid (e.g., gluconic acid, heptogluconic acid), aldaric acid (e.g., glycaric acid, heptoglucaric acid), and uronic acid (e.g., glucuronic acid, heptoglucuronic acid), or their salts or their lactones (i.e. anhydrides).

The sugar or sugars may be used in the present invention, when incorporated into the grinding of cement (preferably blended cement, and most preferably pozzolanic cement), in the amount of 0.0001–0.4 percent, and more preferably 0.0025–0.1 percent, based on the dry weight of the cement Exemplary alkali or alkaline earth metal chlorides salts useful in the invention include calcium chloride, sodium chloride, potassium chloride, lithium chloride, and ammonium chloride, with calcium chloride being preferred. In solution, these salts will, of course, dissociate into their ionic forms, and thus it will be understood that reference to the salt form, e.g., calcium chloride, will stand also as a description of the ionized calcium and chloride molecules when dissolved into an aqueous solution.

Preferably, the salt is used in the amount of 0.0001–1.0 percent, and more preferably 0.002540.175 percent, based on the dry weight of the cement (e.g., pozzolanic cement).

Optionally, although preferably, exemplary additives and methods of the invention further comprise the use of an amine. Exemplary amines include alanolamines (e.g., triethanolamine, trilsopropanolamine, di(ethanol) isopropanolamine, di(isoproponal)amine, etc.). Preferably, the amine is incorporated into the cement (Portland, blended, or, most preferably, pozzolanic cement) in the amount of 0–0.15 percent, and more preferably 0.0005–0.04 percent, based on the dry weight of the cement. The amines may also be used as acetate salts, formate salts, or acrylate salts. For example, triethanolamine acetates may be employed in the methods, additives, and cement compositions (e.g., blended or pozzolanic cement-based compositions) of the invention, and these may provide improved grinding action and/or reduced pack set of the cement.

Other components may be incorporated into the additives of the invention such as surface active defoaming compounds (e.g., a nonionic surfactant such as BASF PLURONIC® 25R2 or an alkylphosphate such as tributyl phosphate). The amounts of such defoaming compounds can be upt to 3 or 4% based on the amount of polyoxyalkylene water reducer used.

In preferred methods of the invention, the preferred manner of using the above-described high early strength enhancing additive components is to incorporate them together into an aqueous solution, and then introduce the solution (as one additive) at one time into the grinding of the pozzolanic cement. The use of a solution to introduce this additive is preferred since the components within the additive would be more easily dispensed into the cement grinding process.

The foregoing description and example set forth are intended for illustrative purposes only, and not to limit the scope of the invention.

Example 1

Pozzolanic cements were tested for early strength according to ASTM C109/C109M-98. A pozzolanic cement, comprising 5–20% metakaolin, was used as a control. Its one day strength was 12.1 MPa; and at three days its strength was 20.1 MPa. The water demand of the control, reflected in terms of percentage of water on dry weight of cement, was 48.9 percent.

When a commercial polyoxyalkylene water reducer (e.g., ADVA® Flow available from Grace Construction Products, Cambridge, Mass.) was introduced (0.01–0.06% s/s cement), the one day and three day strength was enhanced by approximately ten percent above the control. The water demand was 47.3% of cement (and thus a reduction of 3.3%).

When the water reducer (ADVA® brand, 0.03% s/s cement), sodium chloride (about 500 ppm), and triethanolamine (136 ppm) were incorporated into the pozzolanic cement, the one day strength was increased by fourteen percent. (The three day strength increased twelve percent). The water demand was 47.3%.

Surprisingly, however, when the water reducer, sodium chloride (approximately 500 ppm), and triethanolamine were employed in combination with a sugar (e.g., gluconate, corn syrup, and others; or just corn syrup), the one day strength increased thirty percent above the control reference, while the three day strength increased eighteen percent above the control. The water demand was 47.3%.

Example 2

Further pozzolanic samples were made as discussed in Example 1, except that calcium lignosulfonate, a known water reducer, was substituted for the polyoxyalkylene water reducer, no significant water reduction (less than 1%) was seen in an combination with the sugar and/or salt.

Example 3

A further pozzolanic sample was made using naphthalene sulfonate formaldehyde condensate, a known water reducer, was used by itself or in combination with sodium chloride, no water reduction was seen.

Example 4

Additives were formulated based on the dry weight of pozzolanic cement: polyoxyalkylene water reducer (ADVA®) 246 ppm; sugar (sodium gluconate 246 ppm); calcium chloride (300–500 ppm); and triethanolamine 0–136 ppm).

Ordinary Portland Cement (OPC) was combined with the water reducer, sodium chloride (500 ppm), and triethanolamine (as described in Example 1) in combination with sodium gluconate. (OPC was substituted for the pozzolanic cement). It was observed that the one-day strength was increased thirty percent above the control reference, while the three-day strength increased twenty percent above the control.

The foregoing discussion and example was provided for illustration only and are not intended to limit the scope of the invention, as claimed.

It is claimed:

1. A method for improving early strength of cement comprising: introducing into a cement as an interground additive during the grinding of said cement (a) at least one water reducer comprising a polyoxyalkylene comb polymer having a backbone and pendant groups, said comb polymer having oxyalkylene groups in said backbone, said pendant groups, or both, said water reducer being used in the amount of 0.0002–0.4 percent based on dry weight of the cement; (b) a sugar in the amount of 0.0001–0.04 percent based on dry weight of the cement; (c) an alkali or alkaline earth metal chloride in the amount of 0.0001–1.0 percent based on dry weight of the cement; and (d) an amine in an amount of 0.0005–0.15 percent based on dry weight of the cement.

2. The method of claim 1 wherein said oxyalkylene groups in said comb polymer comprises a mixture of ethylene oxide and propylene oxide groups.

3. The method of claim 1 wherein said sugar comprises corn syrup, molasses, glucose, sucrose, gluconic acid or salt thereof, heptogluconic acid or salt thereof, or mixtures thereof.

4. The method of claim 1 wherein said sugar is a gluconic acid or salt thereof.

5. The method of claim 1 wherein said alkali or alkaline earth metal chloride or salt thereof comprises calcium, sodium, potassium, lithium, or ammonium.

6. The method of claim 5 wherein said chloride is calcium chloride.

7. The method of claim 1 wherein said amine comprises triethanolamine, triisopropanolamine, di(ethanol) isopropanolamine, or di(isoproponal)amine.

8. The method of claim 7 wherein said amine comprises a triethanolamine.

9. The method of claim 8 wherein said amine comprises a triethanolamine acetate.

10. The method of claim 1 wherein said polyoxyalkylene polymer comprises a comb polymer having a carbon containing backbone to which is attached groups shown by the structures (I) and (II), and optionally groups shown by structures (III) and (IV), as shown below:

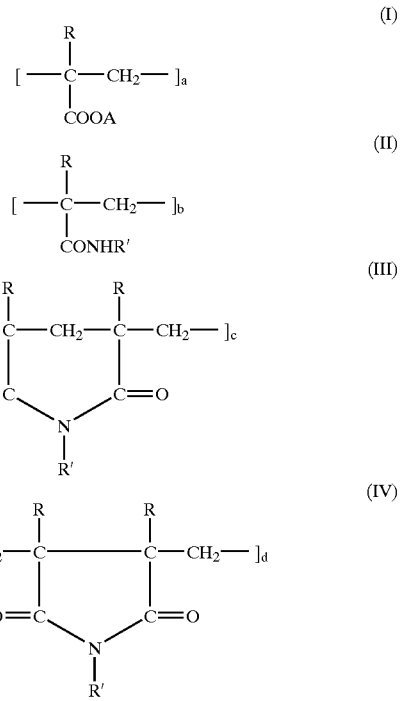

wherein each R independently represents a hydrogen atom or a methyl group (—CH$_3$) group; A represents hydrogen atom, a C$_1$–C$_{10}$ alkyl group, R' or an alkali metal cation or a mixture thereof; R' represents a hydrogen atom or a C$_2$–C$_{10}$ oxyalkylene group represented by (BO)$_n$R" in which O represents an oxygen atom, B represents a C$_2$–C$_{10}$ alkylene group, R" represents a C$_1$–C$_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100−a); and b is not more than [100−(a+c+d)].

11. The method of claim 10 wherein said sugar comprises a gluconic acid or salt thereof, and said chloride comprises calcium chloride, and said method further comprises introducing a triethanolamine as an interground additive to said cement.

12. The method of claim 1 wherein said water reducer, said sugar, and said alkali or alkaline earth metal chloride are provided in aqueous solution form.

13. The method of claim 1 wherein said cement comprises a pozzolanic cement.

14. The method of claim 1 wherein said cement comprises an Ordinary Portland cement.

15. The method of claim 1 wherein said cement comprises a blended cement.

16. An additive for enhancing early strength of cement, comprising (a) at least one water reducer comprising a polyoxyalkylene comb polymer having a backbone and pendant groups, said comb polymer having oxyalkylene groups in said backbone, said pendant groups, or both, said water reducer being used in the amount of 0.0002–0.4 percent; (b) a sugar in the amount of 0.0001–0.04 percent; (c) an alkali or alkaline earth metal chloride in the amount of 0.0001–1.0 percent; and (d) an amine in an amount of 0.0005–0.15 percent, all percentages being based on dry weight of the cement to which said additive is added during grinding.

17. A cement composition comprising a cement and the additive of claim 16.

18. The cement composition of claim 17 further comprising a pozzolan.

19. The cement composition of claim 18 further comprising a fine aggregate, a coarse aggregate, or mixture thereof.

20. The cement composition of claim 19 further comprising at least one pozzolan.

21. The cement composition of claim 20 further comprising a fine aggregate, a course aggregate, or mixture thereof.

* * * * *